United States Patent
Karnik et al.

(10) Patent No.: US 9,188,058 B2
(45) Date of Patent: Nov. 17, 2015

(54) METHOD FOR CONTROLLING A TURBOCHARGER ARRANGEMENT WITH AN ELECTRIC ACTUATOR AND SPRING

(71) Applicant: Ford Global Technologies, LLC, Dearborn, MI (US)

(72) Inventors: Amey Y. Karnik, Mumbai (IN); Yan Wang, Ann Arbor, MI (US); Vladimir V. Kokotovic, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 13/654,309

(22) Filed: Oct. 17, 2012

(65) Prior Publication Data

US 2014/0102092 A1    Apr. 17, 2014

(51) Int. Cl.
*F02D 23/00* (2006.01)
*F02B 37/18* (2006.01)

(52) U.S. Cl.
CPC .............. *F02B 37/186* (2013.01); *Y02T 10/144* (2013.01); *Y10T 29/49233* (2015.01)

(58) Field of Classification Search
CPC .... F02B 37/18; F02B 37/186; F02D 41/0007; Y02T 10/144; Y02T 29/49233
USPC .......................................................... 60/602
See application file for complete search history.

(56) References Cited

U.S. PATENT DOCUMENTS

| | | | | |
|---|---|---|---|---|
| 4,005,579 A * | 2/1977 | Lloyd | | 60/602 |
| 4,174,617 A * | 11/1979 | Jalali-Karchay | | 60/602 |
| 4,378,677 A | 4/1983 | Zumstein | | |
| 4,459,809 A | 7/1984 | Tadokoro et al. | | |
| 4,516,401 A * | 5/1985 | Jackson | | 60/602 |
| 4,656,834 A * | 4/1987 | Elpern | | 60/602 |
| 5,214,919 A * | 6/1993 | Jiewertz et al. | | 60/602 |
| 5,447,031 A * | 9/1995 | Betts et al. | | 60/603 |
| 5,551,236 A * | 9/1996 | Zimmer et al. | | 60/605.1 |
| 5,729,980 A | 3/1998 | Mackay | | |
| 5,799,489 A * | 9/1998 | Lee | | 60/597 |
| 5,816,047 A * | 10/1998 | Zurlo | | 60/602 |
| 6,012,289 A * | 1/2000 | Deckard et al. | | 60/602 |
| 6,161,384 A * | 12/2000 | Reinbold et al. | | 60/602 |

(Continued)

FOREIGN PATENT DOCUMENTS

WO    2008025754 A1    3/2008

OTHER PUBLICATIONS

Kokotovic, Vladimir V. et al., "Method and System for Operating an Engine Turbocharger Waste Gate," U.S. Appl. No. 13/896,260, filed May 16, 2013, 31 pages.

(Continued)

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP

(57) ABSTRACT

Various methods for controlling a wastegate with an electric actuator including a bias are provided. In one example, the actuator is supplied with a first current when moving a wastegate valve toward a fully open position, and is supplied with a second current when moving a wastegate toward a fully closed position. The methods may ensure appropriate supply of boost to an engine even in the event of wastegate degradation while enabling engine downsizing.

19 Claims, 5 Drawing Sheets

(56) References Cited

U.S. PATENT DOCUMENTS

| | | | |
|---|---|---|---|
| 7,926,270 B2 * | 4/2011 | Weaver et al. | ............ 60/602 |
| 8,001,782 B2 | 8/2011 | Pursifull | |
| 8,109,089 B2 | 2/2012 | Gilch et al. | |
| 8,117,841 B2 | 2/2012 | Eckart | |
| 8,347,625 B2 | 1/2013 | Baeuerle | |
| 8,770,544 B2 * | 7/2014 | Kim | ............ 251/129.11 |
| 2006/0237675 A1 * | 10/2006 | Telep et al. | ............ 251/129.11 |
| 2008/0148727 A1 * | 6/2008 | de Ojeda | ............ 60/602 |
| 2009/0048802 A1 | 2/2009 | Wang et al. | |
| 2009/0183507 A1 * | 7/2009 | Weaver et al. | ............ 60/602 |
| 2011/0023481 A1 | 2/2011 | Baeuerle | |
| 2011/0126812 A1 * | 6/2011 | Miyashita | ............ 123/703 |
| 2012/0138827 A1 * | 6/2012 | Kim | ............ 251/129.11 |
| 2012/0171059 A1 | 7/2012 | Love et al. | |

OTHER PUBLICATIONS

Kokotovic, Vladimir V et al., "Electric Waste Gate Control System Sensor Calibration with End-Stop Detection," U.S. Appl. No. 13/896,257, filed May 16, 2013, 33 pages.

Wang, Yan, Method for Determining Wastegate Valve Lift, U.S. Appl. No. 13/914,386, filed Jun. 10, 2013, 28 pages.

* cited by examiner

METHOD FOR CONTROLLING A TURBOCHARGER ARRANGEMENT WITH AN ELECTRIC ACTUATOR AND SPRING

FIELD

The disclosure relates to a method for controlling a turbocharger arrangement of an internal combustion engine with an electric actuator and spring.

BACKGROUND AND SUMMARY

Engines may use a turbocharger to improve engine torque/power output density. In one example, a turbocharger may include a compressor and a turbine connected by a drive shaft, where the turbine is coupled to an exhaust manifold side and the compressor is coupled to an intake manifold side. In this way, the exhaust-driven turbine supplies energy to the compressor to increase the pressure in the intake manifold (e.g. boost, or boost pressure) and to increase the flow of air into the engine. The boost may be controlled by adjusting the amount of gas reaching the turbine, for example with a wastegate. The wastegate valve may be controlled based on operating conditions to achieve the desired boost. In one example, the wastegate valve may be an electronic wastegate controlled by an associated electric actuator. The electric actuator is driven to alter the wastegate position, thereby controlling the amount of gas reaching the turbine and achieving the desired boost. In some downsized engines, whose volumes have been reduced to improve fuel economy, a turbocharger is included to recover the loss in performance due to downsizing.

In some examples, an electric actuator is used to control the position of a wastegate valve. The electric actuator, for example, may be an electric motor which transmits a linear force to a rod. The rod may directly actuate the wastegate valve, or alternatively, the rod may be coupled to a rotating member which transmits rotational motion to the wastegate valve.

The inventors herein have recognized a problem with such approaches utilizing electric actuators to control the position of a wastegate valve. In downsized engines, loss of wastegate valve control due to a degraded actuator may cause insufficient boost to be delivered to the engine. In this case, the engine may not supply the desired level of torque and output. Thus, the degree of downsizing of the engine may be limited due to wastegate degradation concerns. For example, loss in wastegate valve control may cause insufficient boost to be delivered to an engine, particularly when the wastegate valve is pushed into a partially open position due to exhaust flow pressure and flow forces. In this case, the degraded actuator cannot supply sufficient closing force to the valve.

Systems and methods for compensating a degraded electric actuator operatively coupled to a wastegate valve are provided. For example, a method may include adjusting a wastegate actuator coupled to a wastegate valve in an engine exhaust to control an engine boost level of an engine, the adjustment based on a force supplied by a bias.

In one example, a spring is coupled to an electric wastegate actuator, the spring maintaining a wastegate valve in a closed position up to a threshold pressure. In an un-degraded operation, the electric actuator is moved toward an open position with a first current and moved toward a closed position with a second current, in addition to being biased toward the closed position via the spring.

In this way, by coupling a spring to an electric wastegate actuator and maintaining a wastegate valve in a closed position up to a threshold manifold pressure via the biasing spring force (e.g., spring pre-load), sufficient boost may be provided to an engine and desired engine output ensured even if the electric actuator has degraded. Further, due to the supply of closing force via the spring, the size of the electric actuator may be reduced, reducing power consumption. Downsized engines may also forego or reduce dimensioning to account for wastegate degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In boosted engines, electronic wastegate actuators may provide precise output to achieve delivery of a desired boost to the engine. Degradation in the electric actuator, for example due to a loss of power, may reduce accurate control of a wastegate valve and limit engine output power/torque. If the actuator degrades when the wastegate valve is in a partially open position, for example, adequate boost may not be supplied to the engine which then cannot provide the desired output. Such a problem is particularly applicable to downsized engines whose dimensions are reduced to improve fuel economy. In downsized engines, a turbocharger may be included to recover the performance loss due to downsizing. If an electric actuator controlling the turbocharger degrades, boost may not be sufficiently provided to the engine, and the engine cannot provide the desired output. Such downsized engines are consequently dimensioned to account for wastegate actuator degradation, limiting the extent of downsizing and thus the gains in fuel economy. On the other hand, if the actuator degrades when the wastegate valve is in a fully closed position, boost may be provided to the engine in an amount greater than desired, resulting in lean combustion and degraded emissions.

Figure 1:
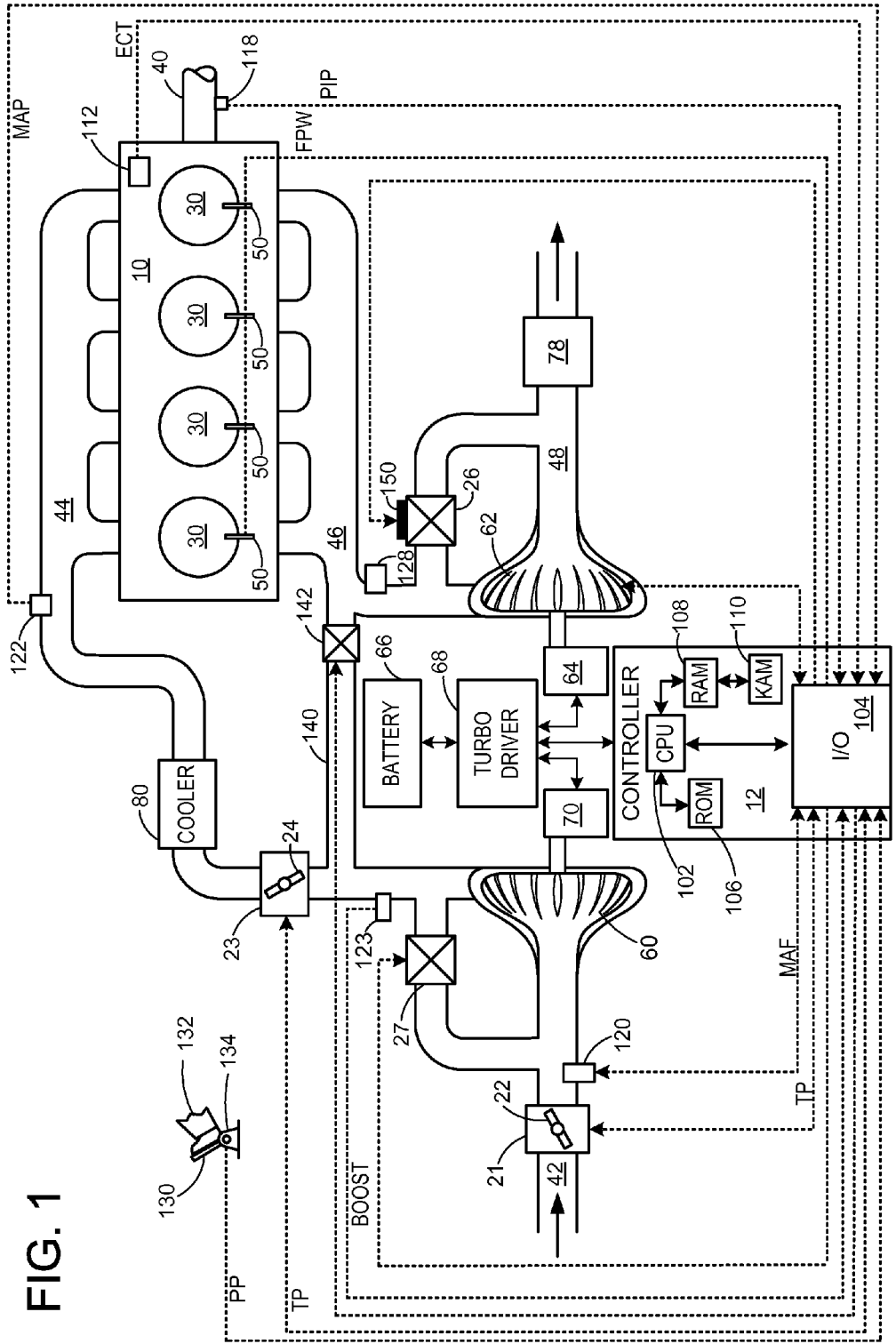
FIG. 1 shows a block diagram of a turbocharged engine including a wastegate.
Figure 2:
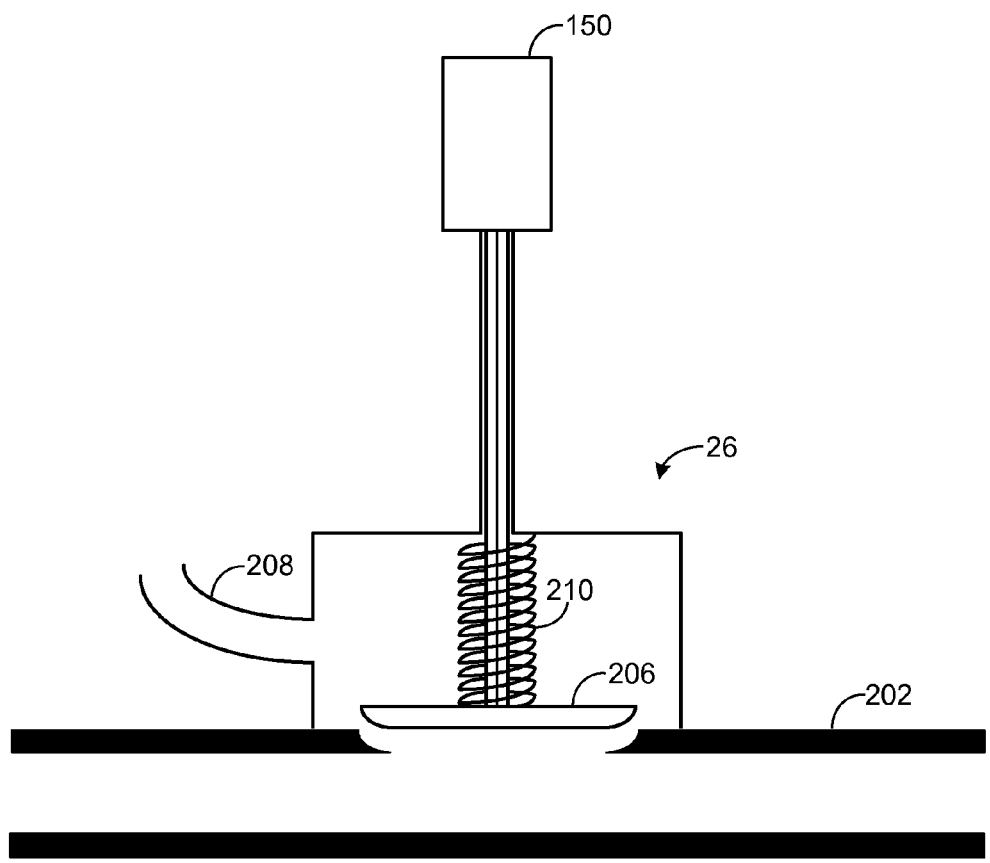
FIG. 2 shows an exemplary wastegate in accordance with an embodiment of the present disclosure.
Figure 4:
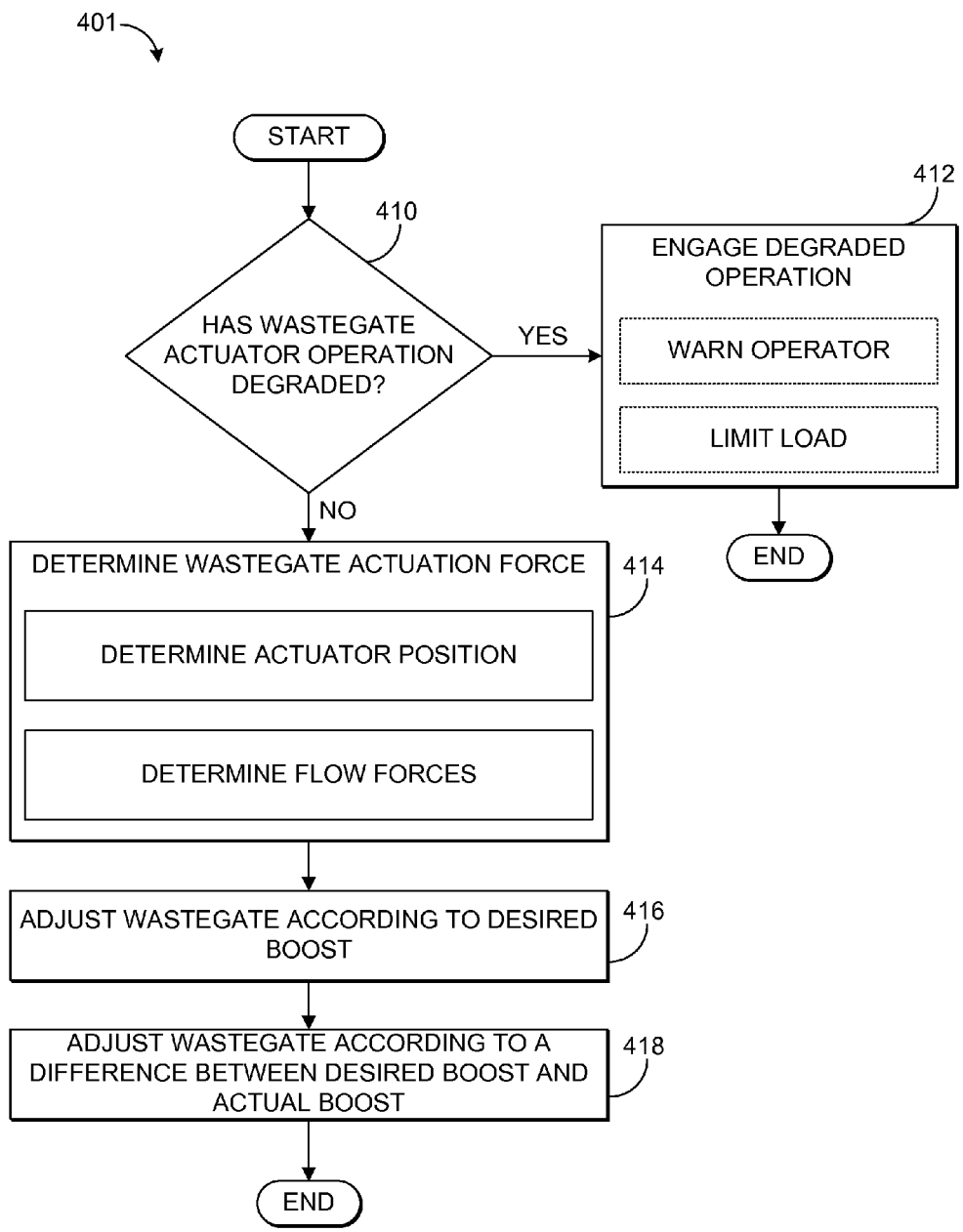
FIG. 4 shows a flow chart illustrating a method for controlling a wastegate associated with a turbocharger.
Figure 5:
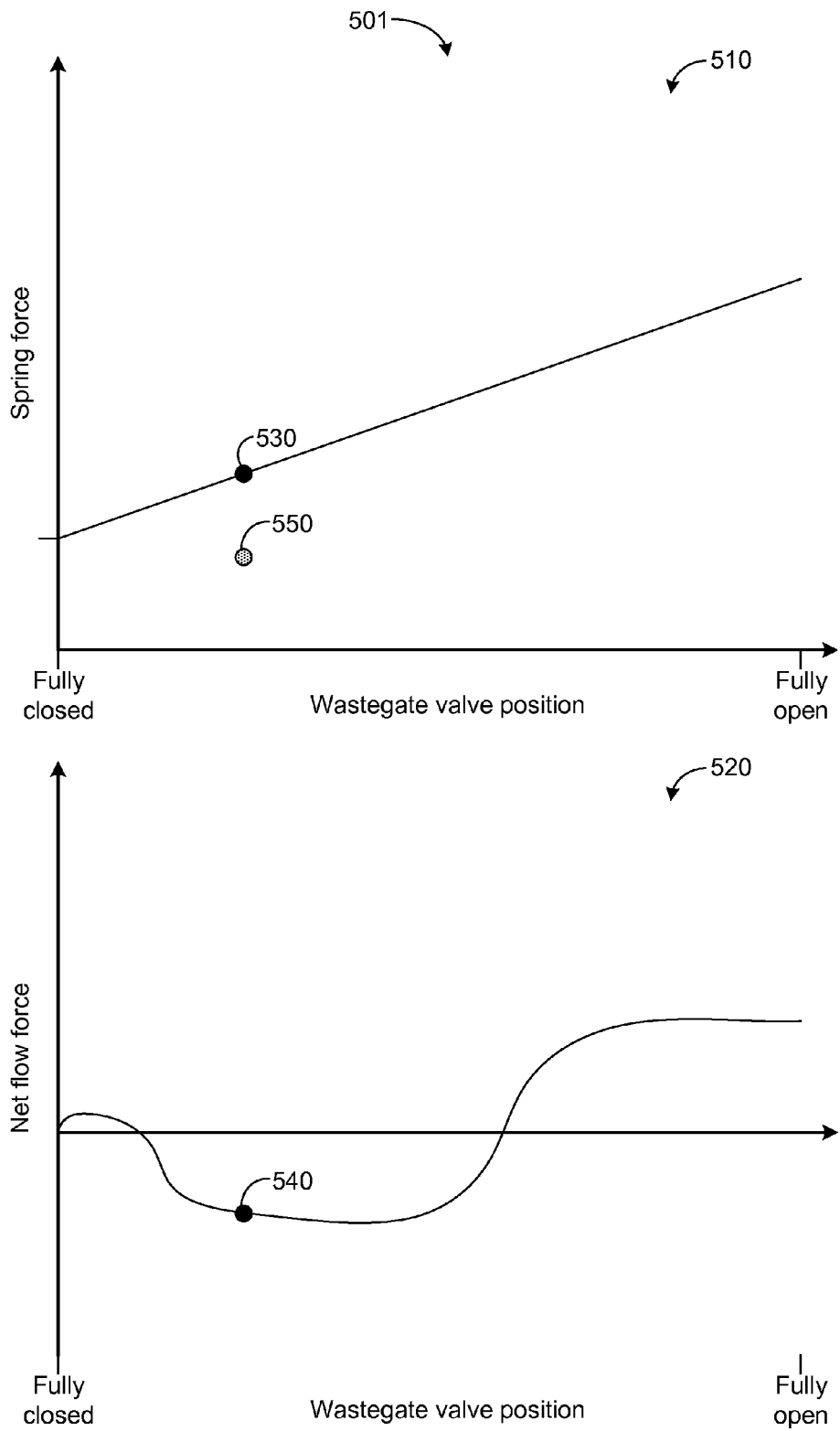
FIG. 5 shows a protocol for determining wastegate actuation force.

Various systems and methods are provided for compensating a degraded electric wastegate actuator. In one embodiment, a spring is coupled to an electric wastegate actuator, the spring maintaining a wastegate valve in a closed position up to a threshold manifold pressure. During operation, the electric actuator is moved toward an open position with a first current and moved toward a closed position with a second current. FIG. 1 is a block diagram of a turbocharged engine including a wastegate. FIG. 2 shows an exemplary wastegate included in the engine of FIG. 1 in accordance with an embodiment of the present disclosure. The engine of FIG. 1 also includes a controller configured to carry out the methods depicted in FIGS. 3 and 4. FIG. 5 shows a protocol for determining wastegate actuation force.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttles 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator. In some embodiments, actuator 150 may be an electric motor. Additional detail regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example. Additional details of an example wastegate that may be used in the system of FIG. 1 are shown in FIG. 2.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, wastegate 26 and actuator 150, both of engine 10, are shown in greater detail. Wastegate 26 is included along a portion of an exhaust manifold 202, which may be exhaust manifold 46 shown in FIG. 1, for example. In the illustrated embodiment, wastegate 26 is an electric wastegate and is driven by actuator 150, which in this example is a solenoid, though various suitable devices may be used to drive the wastegate. Actuator 150 transmits a driving force to a wastegate valve 206, which may transition between a fully closed position and a fully open position, and may settle at any position therebetween. Wastegate 26 also includes a vent 208 which may receive and exhaust gas from exhaust manifold 202 when wastegate valve 206 is not in the fully closed position. Thus, the amount of boost supplied to an engine may be controlled by driving wastegate valve 206 via actuator 150, thereby altering the position of wastegate valve 206 and the amount of gas reaching an intake manifold. In one example, the valve 206 may be formed via a pintle, with a surface area facing the flow through manifold 202. The pressure difference across the pintle may generate forces acting to move the pintle. Although not shown, wastegate 26 may include a motor, gear box, and linkage from an output shaft of the gear box to wastegate valve 206. In some embodiments, a bias may be coupled to the output shaft whose type and physical characteristics may be determined by the motion of the output shaft. However, various suitable wastegate arrangements may be used without departing from scope of the present disclosure, and may, for example, depend on mechanical design and packaging constraints.

Wastegate 26 further includes a bias 210. Bias 210 is attached at one end to wastegate 26 and to wastegate valve 206 at the other end. In some embodiments, bias 210 is selected to supply a closing force which maintains wastegate valve 206 in a fully closed position up to a threshold pressure. As one non-limiting example, bias 210 may be selected to allow wastegate valve 206 to open for a mean pressure difference across the turbocharger turbine between 0.75 bar and 1 bar. In the event of wastegate degradation, for example due to a loss of power to actuator 150, wastegate valve 206 may be maintained in a fully closed position up to a threshold pressure via the spring pre-load, ensuring that a sufficient buildup of boost is delivered to the engine. Such a configuration may be particularly advantageous in downsized engines, as the extent of downsizing need not be limited to account for the possibility of wastegate actuator degradation. Conversely, at or above the threshold pressure, bias 210 may allow wastegate valve 206 to move toward a fully open position, limiting maximum boost, especially at high loads. Moreover, the size of a wastegate actuator (e.g., actuator 150) and its power consumption may be reduced, as bias 210 supplies additional closing force to wastegate 26. Therefore, during non-degraded operation, the actuator may hold the valve in the fully closed position with a current level that is lower than if the spring pre-load was zero. As described below with reference to FIG. 5, the current supplied to a wastegate actuator may be selected to account for the closing force of a bias, such as the spring. In the illustrated embodiment, bias 210 is shown as a spring in a precompressed state, though various suitable structures may be used to supply additional closing force to wastegate 26. In the case where a spring is employed, the spring constant may be selected to supply closing force up to a particular threshold pressure and supply sufficient boost to an engine.

Wastegate 26 may provide additional advantages. Pneumatic wastegates, in some examples, supply closing force to a wastegate valve by creating a pressure differential across a diaphragm which is attached to a spring. Such pneumatic wastegates are therefore limited in their supply of force to the pressure differential and the spring force. In a normal operating condition, wastegate 26 may instead supply higher levels of closing force via bias 210 and its associated electric actuator (e.g., actuator 150). As such, even while maintaining the wastegate fully closed, the actuator current may be adjusted responsive to engine operating conditions (e.g., increased for increasing exhaust manifold pressure, and vice versa) in order to maintain the fully closed position in combination with the spring pre-load force, the spring pre-load force being non-zero.

Figure 3:
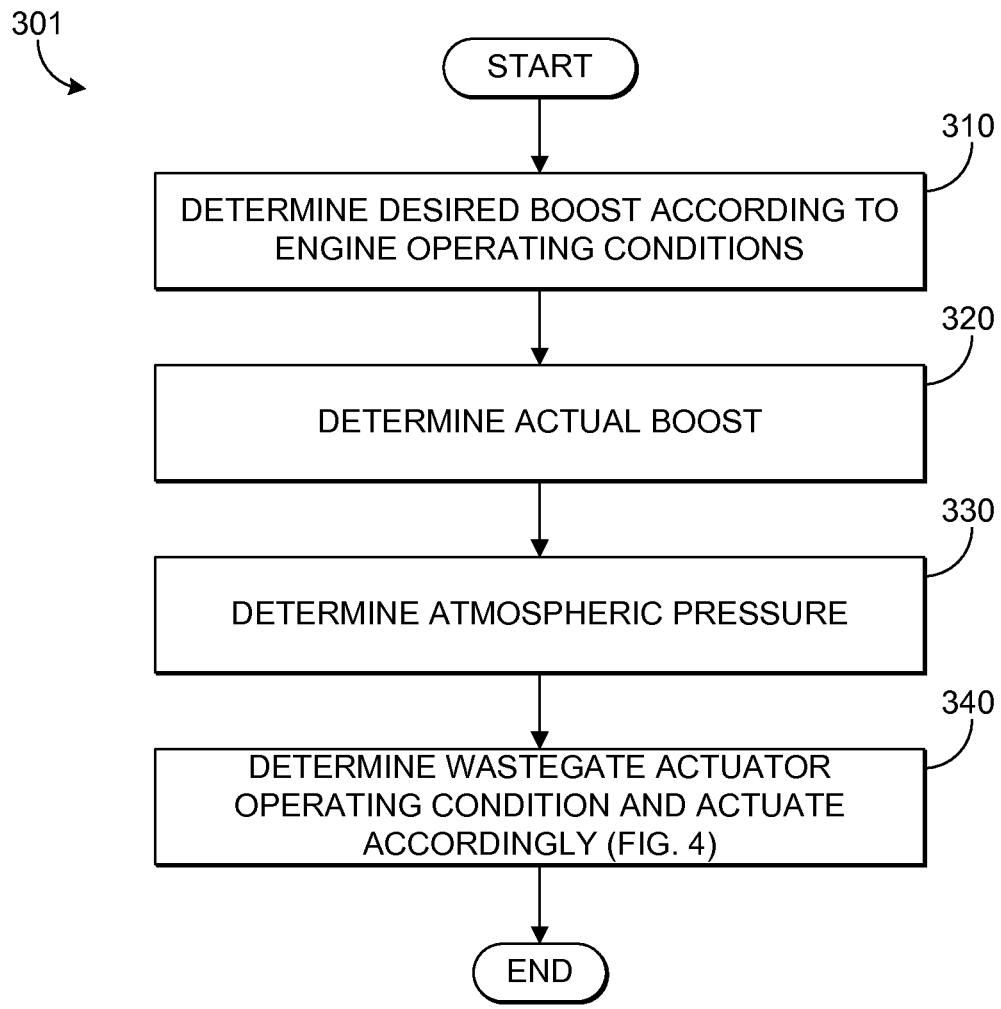
FIG. 3 shows a flow chart illustrating a method for controlling a turbocharger via a wastegate.

Turning now to FIG. 3, a method 301 may be executed by an engine controller (e.g., controller 12) for controlling a turbocharger via a wastegate (e.g., wastegate 26). In one example, a method of controlling a turbocharger of an engine via a wastegate may comprise determining a desired boost pressure and an actual boost pressure. The operating condition of a wastegate actuator (e.g., actuator 150) may then be determined and actuated accordingly.

Continuing with FIG. 3, at 310, the method includes determining a desired boost according to engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST from sensor 123), engine speed, idle speed, barometric pressure, a driver-demanded torque (for example, from a pedal position sensor 134), air temperature, vehicle speed, etc.

Next, at 320, an actual boost may be determined. The actual boost may be directly measured from a sensor, such as sensor 123. The measurement may be sent to controller 12 via the BOOST signal and stored in a computer readable storage medium. In an alternative embodiment, the actual boost may be estimated based on other operating parameters, such as based on MAP and RPM, for example.

Next, at 330, atmospheric pressure may be determined. For example, atmospheric pressure may be measured from the MAP sensor at engine start-up, and/or estimated based on operating conditions of the engine, including MAF, MAP, throttle position, etc. The measurement may be sent to controller 12 and stored in a computer readable storage medium. In an alternative embodiment, the atmospheric pressure may be estimated based on other operating parameters.

Next, at 340, the operating condition of a wastegate actuator may be determined. The wastegate actuator may be actuator 150 shown in FIG. 1, for example. The actuator is actuated based on the determined operating condition, which may either be a normal operating condition or a degraded operating condition.

As described above, a wastegate (e.g., wastegate 26 in FIG. 1) may be operated by an actuator (e.g., actuator 150). FIG. 4 is shown providing additional details of the actions carried out in 340. Method 401 may be carried out by an engine controller (e.g., controller 12), for example. Method 401 specifically determines the operating condition of the wastegate actuator and actuates the wastegate actuator based on the determined operating condition. While method 401 is shown as being executed after method 301, it will be understood that method 401 may be executed before method 301 without departing from the scope of this disclosure.

At 410 of method 401, it is determined whether or not the operating condition of the wastegate actuator has degraded. Various suitable methods may be used to assess the operating condition of the wastegate actuator, and may include monitoring the power drawn by the actuator. For example, a position of the actuator may be compared to a desired position to determine if the wastegate valve is being controlled as requested. Further, current or voltage monitoring may be used. If it is determined that the operating condition of the actuator has degraded, method 401 proceeds to method 412.

At 412 of method 401, a degraded operation mode is engaged. A bias of the wastegate (e.g., bias 210) may be relied on to supply closing force to a wastegate valve (e.g., wastegate valve 206) up to a threshold pressure, as described above particularly with reference to FIG. 2, without any adjustment of actuator current responsive to operating conditions. Method 401 may take further optional action at 412, including indicating to a vehicle operator that the wastegate operating condition has degraded, for example via a dashboard indicator and/or setting a diagnostic code. At 412, method 402 may also take actions via controller 12 to limit engine load, which may include moving various throttles toward closed positions in response to engine airflow being greater than a threshold limit, as well as reducing fuel injection to enlean combustion in the engine cylinders.

If, at 410, method 401 determines that wastegate actuator operation has not degraded, method 401 proceeds to 414.

At 414 of method 401, a wastegate actuation force may be calculated based on a pressure differential across the wastegate, exhaust flow, closing force supplied by bias 210, and/or the angle of the wastegate valve. The wastegate may be adjusted according to the wastegate actuation force. The wastegate actuation force may accurately resemble a pressure differential across the wastegate. For example, the wastegate actuation force may be used as an input to an inverse wastegate model. The inverse wastegate model may map a desired wastegate pressure or a desired wastegate valve position to a wastegate duty cycle for a given wastegate actuation force, where the duty cycle signal is generated by the controller and sent to the wastegate actuator to adjust the actuation force. Mapping to a wastegate duty cycle may include using lookup tables or calculating the wastegate duty cycle. A wastegate control (WGC) signal may include pulse width modulation via the wastegate duty cycle to adjust the wastegate. The desired wastegate pressure or the desired wastegate valve position may be determined from feed-forward, feedback, or other control algorithms, for example.

The wastegate actuation force may also affect the dynamics of the wastegate. A compensation term may account for delays of the wastegate actuator, as described herein with regard to the controller with zeros cancelling poles of the wastegate actuator model. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

At 414, determining a wastegate actuation force also includes determining the position of the actuator (e.g., actuator 150). A measurement is first made which depends on the particular type of actuator used. In one example, a sensor is made available and used to measure linear displacement of a rod actuated by the actuator. Alternatively, the actuator may include a motor which may in turn include a rotary encoder housed internally in the motor. The encoder may be coupled to the slowest rotating element in the motor which is coupled to an actuating rod. Such an encoder may collect measurements across the entire range through which the element rotates, which may be for example 180 degrees. In this case, the output of the encoder varies as the motor rotates. In another example, the motor includes a screw (e.g., a ball screw), whose rotation may be measured and used to determine the position of the motor. However, a different positional encoder may be used, as the ball screw or other rotating element may rotate through a range greater than 180 and/or 360 degrees. Various suitable encoders may be used which, for example, detect changes in angular position as opposed to absolute position.

Determining a wastegate actuation force also includes determining flow forces acting on the wastegate. In one example, flow forces are determined based on a model. Alternatively, a pressure differential across the wastegate is calculated and used to determine the flow forces. In another example, a lookup table is generated with inputs including wastegate position to determine the flow forces. Such methods may employ the use of one or more sensors or sensor signals disposed in engine 10, including mass air flow sensor 120, manifold air pressure sensor 122, throttle position signal TP, BOOST from sensor 123, and a turbocharger rotational speed signal, and may optionally employ the use of one or more load sensors.

The compensation term described above may further account for the closing force supplied by the bias (e.g., bias 210), which is a function of the spring rate and the valve position. By taking into account both flow forces and spring forces, among other quantities, an appropriate wastegate actuation force may be determined. In the embodiment in which bias 210 is a spring, method 401 may account for the instantaneous spring force due to precompression/pre-loading of the spring in the fully closed position. In some examples, spring force is determined based on the relation F=kx+pre-load, where F is spring force, k the spring constant, and x the linear displacement or deflection of the valve from the fully closed position. The spring constant k may be determined ahead of time or determined during engine operation. When it is determined that the wastegate valve should be moved toward a fully open position, the associated wastegate actuator (e.g., actuator 150) may move the wastegate valve in a direction opposite that of the closing force supplied by the bias. Accordingly, a greater actuating force is required than would be the case without the inclusion of a bias. The compensation term may thus include an adjustment to cause an increased first current, voltage, signal, or duty cycle to be supplied to the wastegate actuator. If it is instead determined that the wastegate valve should be moved toward a fully closed position, the wastegate actuator may move the wastegate valve in a direction substantially parallel to the direction of the closing force supplied by the bias. A smaller actuating force may thus be applied. The compensation term may then include an adjustment to cause a reduced second current, voltage, signal, or duty cycle to be supplied to the wastegate actuator. In some embodiments, the second current, voltage, signal, or duty cycle may be less than the first current, voltage, signal, or duty cycle. However, it will be understood that the second current, voltage, signal, or duty cycle may be greater than the first current, voltage, signal, or duty cycle, and that the present disclosure may be adapted for this case and also for embodiments in which a bias supplies an opening force substantially opposite to the closing force discussed above. The compensation term may further include an adjustment to cause a third current, voltage, signal, or duty cycle to be supplied to the wastegate actuator, which may be, for example, greater than the second current, voltage, signal, or duty cycle when the wastegate valve is at a third position more open than that for which the second current, voltage, signal, or duty cycle was used. Still further, the compensation term may include an adjustment to cause a current responsive to the instantaneous position of the wastegate valve to be supplied to the wastegate actuator. In some instances method 401 may determine a wastegate actuation force substantially equal to zero—i.e., no force need be supplied to the wastegate. Such a determination may be made during instances in which the closing force supplied by bias 210 is sufficient to keep the wastegate valve in a position which facilitates the appropriate supply of boost to the engine, for example.

Further, as described above, the actuation current applied to the actuator may vary, even while the valve is in the fully closed position. Such adjustments may take into account the preload force, as well as varying differential pressure forces on the actuator pintle faces. Such an approach can reduce the current required at fully closed position, while still maintaining the fully closed position.

Turning now to FIG. 5, an exemplary protocol 501 is shown for determining a wastegate actuation force. A first graph 510 is shown illustrating a relationship between the force produced by a bias and the position of a wastegate valve. In this example, forces acting along the wastegate actuator axis (e.g., perpendicular to the surface of wastegate valve 206) are taken to be positive, while forces acting substantially in the opposite direction are taken to be negative. As described above, the relationship may be modeled by the function F=kx+pre-load, for example. Due to precompression/preload, the spring force is positively offset along the y-axis, as the bias supplies a closing force when the wastegate valve is in a fully closed position. A second graph 520 is also shown illustrating the relationship between the net flow force (e.g., the net sum of all flow forces in the exhaust manifold, pressure differential across the wastegate, etc.) and the wastegate valve position. It will be understood that graph 520 shows a relation for a particular set of operating conditions (e.g., engine speed, load, etc.), and that the relation will vary as the operating conditions vary. Based on these graphs, protocol 501 may determine a wastegate actuation force for a particular wastegate valve position and operating conditions. Protocol 501 may determine a spring force 530 at a particular wastegate valve position (e.g., the current wastegate valve position) and also determine a net flow force 540 at the same valve position. Subsequently, protocol 501 may add spring force 530 to net flow force 540 to obtain a wastegate actuation force 550. It will be understood that protocol 501 is included as a non-limiting example, and that other various suitable methods may be used to determine a wastegate actuation force.

Returning to FIG. 4, at 416 of method 401, the wastegate may be adjusted according to the desired boost. For example, the desired boost may be used as an input to a feed-forward control algorithm for adjusting the wastegate. The feed-forward control algorithm may calculate a target wastegate pressure or a target wastegate valve position that may be used as a component of an input to an inverse wastegate model to determine a wastegate duty cycle.

At 418 of method 410, a boost error may be calculated as a difference between the desired boost and the actual boost. The wastegate may be adjusted according to the boost error. For example, the boost error may be used as an input to a feedback control algorithm to calculate a target wastegate pressure or a target wastegate valve position that may be used as a component of an input to the inverse wastegate model to determine the wastegate duty cycle. The control algorithm may include a compensation term as described above.

In this way, undesirable turbocharger and engine operation due to degraded wastegate control may be reduced and/or eliminated. By including a bias supplying a closing force to a wastegate valve, the wastegate valve may be maintained in a fully closed position up to a threshold pressure, ensuring that sufficient boost is delivered to an engine, even in the event of wastegate degradation. When the pressure exceeds the threshold pressure, the wastegate valve may be moved toward a fully open position, limiting boost. Accordingly, a first increased current, voltage, signal, or duty cycle may be supplied to a wastegate actuator when moving the wastegate valve toward a fully open position, while a second reduced current, voltage, signal, or duty cycle may be supplied when moving the wastegate valve toward a fully closed position. Such a configuration may reduce a limit to the extent of downsizing and gains in fuel economy in downsized engines. Moreover, the size and power consumption of a wastegate actuator may be reduced due to the closing force supplied by the bias.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a wastegate actuator coupled to a wastegate valve of a turbocharged internal combustion engine having an electronic controller including executable instructions stored in non-transitory memory, comprising:
    determining a wastegate actuation force based on a determined bias force supplied by a bias and a determined net exhaust flow force across the wastegate valve via the electronic controller during engine operation; and
    adjusting the wastegate actuator coupled to the wastegate valve in an exhaust passage of the engine to control a boost level in an intake of the engine in response to the wastegate actuation force via the electronic controller.

2. The method of claim 1 further including
    adjusting a current supplied to the actuator, the bias including a spring, the spring pre-loaded with the wastegate fully closed, and where the electronic controller determines the net exhaust flow force across the wastegate valve based on a pressure differential across the valve.

3. The method of claim 1 further including
    adjusting a voltage supplied to the actuator, the bias including a spring, the spring pre-loaded with the wastegate fully closed, and where the electronic controller determines the net exhaust flow force across the wastegate valve based on a lookup table with wastegate position as an input.

4. The method of claim 1 further including adjusting a duty cycle supplied to the actuator, the bias including a spring, the spring pre-loaded with the wastegate fully closed.

5. The method of claim 2 further including supplying a first current to move the wastegate valve toward a fully open position, and supplying a second current to move the wastegate valve toward a fully closed position.

6. The method of claim 5 wherein the first current is greater than the second current, and
    wherein the supply of the first and second currents generates respective forces.

7. A wastegate system for a turbocharged internal combustion engine, comprising:
    a wastegate valve disposed along an exhaust manifold of the engine;
    an actuator operatively coupled to the wastegate valve;
    a bias coupled to the wastegate valve, the bias supplying a closing force to the wastegate valve and the bias being pre-loaded in a fully closed position; and
    an electronic controller including non-transitory instructions stored in memory executable to:
    determine a bias force supplied by the bias;
    determine a net exhaust flow force across the wastegate valve;
    determine an actuator force by adding the bias force to the net exhaust flow force; and
    adjust the actuator based on the actuator force.

8. The wastegate of claim 7 wherein the bias is a spring, and where the instructions are further executable to determine the bias force based on a spring pre-load force.

9. The wastegate of claim 7 wherein the bias maintains the wastegate valve in the fully closed position up to a threshold pressure via the closing force.

10. A method of controlling via an electronic controller including non-transitory instructions stored in memory an engine turbocharger wastegate valve via an electric actuator, comprising:
    at a first fully closed position of the wastegate valve, supplying a first current via the electronic controller;
    at a second partially open position of the wastegate valve, supplying a second current, greater than the first current via the electronic controller; and
    at a third open position of the wastegate valve greater than the second partially open position, supplying a third current, greater than the second current; and
    wherein the first, second and third currents are determined via the electronic controller in response to a net exhaust flow force determined by the electronic controller across the wastegate valve.

11. The method of claim 10, further comprising at the first fully closed position, adjusting the first current responsive to engine operating conditions determined by the electronic controller.

12. The method of claim 11 wherein the first current is increased at the first fully closed position responsive to increasing exhaust manifold pressure, with the wastegate valve remaining at the first fully closed position.

13. The method of claim 12 wherein the first current is decreased at the first fully closed position responsive to decreasing exhaust manifold pressure, with the wastegate valve remaining at the first fully closed position.

14. The method of claim 11 wherein the engine operating conditions include one or more of an exhaust pressure, engine speed, engine load, spark retard, and air-fuel ratio.

15. The method of claim 10, further comprising via the electronic controller supplying a current responsive to an instantaneous position of the electric actuator determined by the electronic controller.

16. The method of claim 10, further comprising in a degraded operation mode of the electric actuator, limiting an engine load, the degraded operation mode determined by the electronic controller.

17. The method of claim 10, further comprising:
    determining a bias force; and
    determining a wastegate actuation force by adding the determined net exhaust flow force to the bias force.

18. The method of claim 10 further comprising mapping a desired wastegate valve position determined by the electronic controller to a wastegate duty cycle for a given wastegate actuator force.

19. The method of claim 18 wherein the wastegate valve is adjusted by adjusting the wastegate duty cycle delivered to the electric actuator from the electronic controller.

* * * * *